July 20, 1971     F. P. LAMING ET AL     3,594,167

METHOD OF PREPARING HOLOGRAM USING GLASSEOUS RECORDING MEDIUM

Filed April 16, 1968

INVENTORS F. P. LAMING
A. D. PEARSON
BY
ATTORNEY

3,594,167
METHOD OF PREPARING HOLOGRAM USING GLASSEOUS RECORDING MEDIUM

Frank P. Laming, North Plainfield, and Arthur D. Pearson, Bernardsville, N.J., assignors to Bell Telephone Laboratories, Incorporated, Murray Hill and Berkeley Heights, N.J.
Filed Apr. 16, 1968, Ser. No. 721,692
Int. Cl. G03c 5/04
U.S. Cl. 96—27                                         10 Claims

ABSTRACT OF THE DISCLOSURE

Certain glassy compositions comprising arsenic, sulfur, and optionally included other elements, make excellent holographic recording media with large multiple storage capabilities and good diffracted powers.

BACKGROUND OF THE INVENTION

This invention relates to the recording of information by holography, and in particular embodiments to multiple storage holograms, wherein the recording medium consists essentially of certain glassy compositions.

It is commonplace to find holograms made in recording media of photographic emulsions. The photographic plate, on which the hologram is to be recorded, has its emulsion exposed by interfering incident laser beams, one representing, perhaps, an information beam and the other a reference beam. As is the case with ordinary photography, the exposed emulsion is developed and fixed to yield a medium having a non-uniform density of light-absorbing silver particles, the non-uniformity being related, of course, to the variation in light intensity of the object of interest. Generally, in holography, then, as in common photography, reconstruction depends upon the ability of the developed emulsion medium to absorb the light used to "read" the recorded information and hence the process is inherently a lossy one.

Unlike ordinary photography, however, holography does not record an image, but rather an extremely complex interference pattern; indeed, the hologram is, in essence, a complicated diffraction pattern. Unfortunately, due to their lossy nature, photographic emulsion holograms are not very efficient; moreover, the grain structure of a photographic emulsion is an inherent limiting factor on resolution and quality of diffraction.

It is known in general, however, that a variation of the refractive index of a transmitting recording medium, rather than variation of opacity, would result in desired diffraction with lower losses. An approach along this line has been to use soluble transmitting media which are selectively rendered insoluble upon exposure to light, and then subjected to an etching step which removes the still-soluble portions, thereby resulting in a surface characterized by a variation in thickness of the media. Diffraction, which results in reconstruction, is based on the differences in the indicies of refraction of the media and air, and increases with $\Delta n.t$, where $n$ is the difference of the indicies of refraction, and $t$ is the thickness of the medium.

This technique, however, has certain inherent problems. Because $\Delta n$ is brought about by the removal of material, thin films are necessary to minimize undercutting during etching; this, however, as indicated by the above equation, is contrary to what is desired. Furthermore, thin films unduly limit the information storage capabilities of the hologram. The glassy recording media of this application overcomes these, and other, problems.

SUMMARY OF THE INVENTION

In accordance with the invention, a new and unusual method of holographic recording has been found which comprises the devitrification of certain glass compositions to alter certain of their optical properties. These compositions in the main are arsenic-sulfur glasses containing from about 22 to 90 mole percent sulfur, together with one or more optionally added constituents, such as bromine and iodine, as well as other elements which may be added for purposes not inconsistent with the invention.

Devitrification and alteration in their optical properties, is brought about in the glasses by the direct action of the incident light energy. The incident energy initiates a series of chemical events within the glass which, although not fully understood, result in changes in optical parameters without further external stimulus; that is the subject compositions are considered self-developing holographic materials.

Diffracted power efficiencies of the glasses as high as 18 percent have been measured, and no doubt higher efficiencies are possible; hence, strong read-out signals are obtainable.

In addition, the information storage capabilities of these materials can be made quite considerable for at least two good reasons. First, unlike other media, the glasses can be formed into quite thick films or plates without difficulty; hence, they provide large volumes in which many holographic "planes" can be formed by multiple exposures; and second, regardless of film size, such planes can be closely stacked owing to the sensitivity of the read-out signal to the angular displacement of the film from the Bragg angle.

DESCRIPTION OF THE DRAWING

The invention will be further described and particularized in the following detailed description in conjunction with the accompanying drawing in which.

DETAILED DESCRIPTION OF THE INVENTION

The glasseous compositions described in the preceding summary are prepared in accordance with the methods and techniques fully disclosed in U.S. Pats. Nos. 2,961,350 and 3,024,119, and in various technical publications as well. Accordingly, no elaboration on the known details of their manufacture is believed necessary for a full understanding of the invention of this application.

The invention is premised on the discovery that these glasses are capable of undergoing changes of their optical properties in response to certain incident light energy which were not heretofore apparent. The nature of these changes, while not fully understood, nonetheless clearly enables information to be holographically recorded within the glassy system.

The underlying principle of any hologram or diffraction grating is the interference of light. When interference is brought about by a periodic variation in absorptivity of the recording medium, such as by alternating opaque and transparent bands, the hologram is of the so-called spatial transmittance type. A photographic emulsion hologram, for example, is of this type. In theory, the maximum efficiency, defined as the ratio of the diffracted intensity that contributes to reconstruction of the original energy wavefront to the intensity of the reconstructing beam, for absorption holograms is about 0.06. A typical efficiency achieved by experimenters using photographic emulsions is roughly 0.04.

Figure 1:
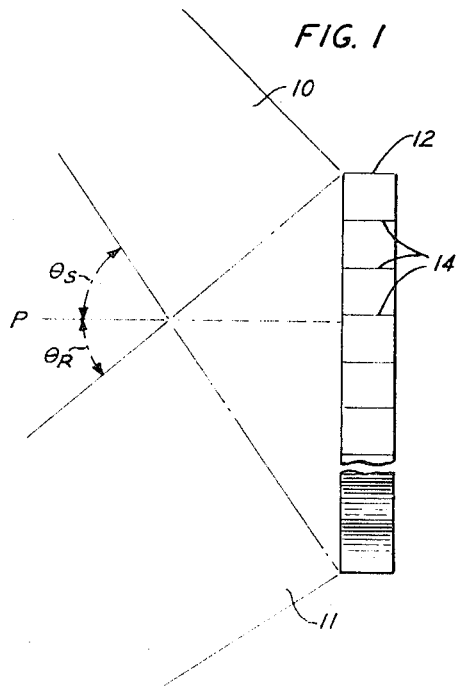
FIG. 1 is a diagrammatic representation of a side view of a glassy hologram of the invention, bathed in incident light beams.

In another case, interference is achieved not through variation in absorptivity, but by a variation in the index of refraction of a transmitting medium, which in turn effects a phase shift and hence interference. The making of such a hologram is straightforward and is depicted on FIG. 1. Source beam 10 and reference beam 11 (both of which may include any source of diffuse energy) are directed at recording medium 12, shown in cross-section, the beams impinging at angles $\theta_s$ and $\theta_r$, respectively defined by the beam and the normal P to the recording medium 12. During exposure, the interference wavefront which results from the interfering source and reference beams is "recorded" as a variation in index of refraction of medium 12. This variation in index is of a periodic nature, which is symbolically shown in the lower broken-away portion of FIG. 1 as a variation in line intensity, wherein darker lines or areas indicate greater changes in the local refractive indices. As a further aid to explanation, small changes are not shown at all, and areas of greatest change are shown as "plane edges" 14 (i.e., lines) in the upper portion of the figure and in subsequent figures.

Figure 2A:
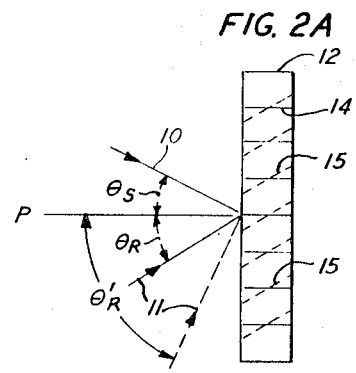
FIGS. 2A and 2B are diagrammatic representations of side views of glassy holograms of the invention showing orientation of "planes" of index change.
Figure 2B:
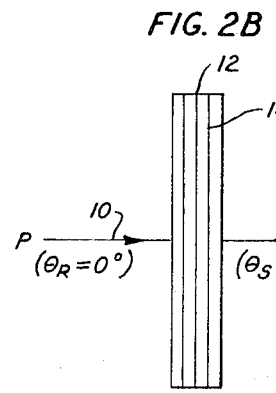

The orientation of these planes is dependent upon $\theta_s$ and $\theta_r$. If the angles are equal, planes 14 are depicted as in FIG. 1 and again in FIG. 2A. If the angles are made unequal, as by resorting to $\theta'_r$, new planes 15 are recorded, as in FIG. 2A (and also they may be somewhat bowed, although this is not of concern to the present invention); and finally, if source beam 10 and reference beam 11 impinge normally on opposite sides of the medium 12, the orientation of the planes is a full 90° rotated from the case in FIG. 2A, as shown in FIG. 2B.

Accordingly, successively produced planes can be introduced into the recording medium at selected orientations by coordinating discreet changes in $\theta_s$ and/or $\theta_r$ with multiple successive exposures. Similarly, read-out of selected planes is accomplished by coordinating the angle of incidence of the reconstructing beam with the planes as, for example, by rotating the hologram in the presence of a fixed beam.

In this fashion, multiple storage is achieved. The question arises, however, as to just how closely may the "planes" of index change be placed next to one another. Keeping in mind that the planes are approximations to a periodic variation in the change, the question becomes one as to how rapid is the fall-off of the maximum read-out intensity signal of one plane with respect to a deviation in the angle that the reconstructing beam makes with the recording medium (and hence to the plane itself). The faster the fall-off of one group of planes, the lesser is the angle by which the orientation of the recording medium with respect to the write or read-out beam must change before recording of the next group of planes, is in a practical sense, permitted.

The required change in $\theta$, $\Delta\theta$, is determined by an arbitrary standard against which signal intensity (I) is measured. Typically, a fall-off from I to I/2 is the standard. The value of $\Delta\theta$ for this to occur is considered the "bandpass."

It is known that bandpass becomes narrower with increasing thickness of the recording medium (see D. R. Bosomworth and H. J. Gerritsen, Applied Optics, vol. 7, pp. 95 to 98, 1968). Accordingly, the glass compositions alluded to above offer potentially large storage capabilities in view of the ease with which they may be formed into thick optical plates.

Figure 3:
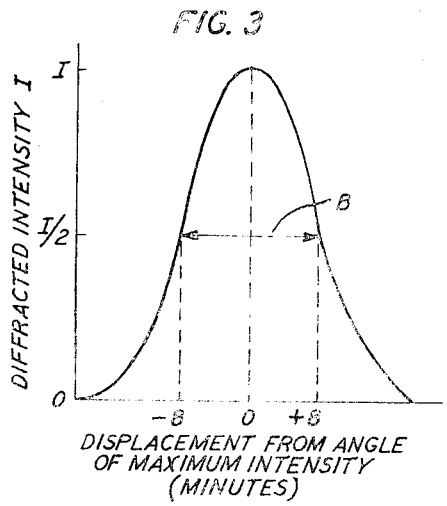
FIG. 3 is a graphical presentation of the relationship between Diffracted Intensity (I), in arbitrary units, and Angular Displacement, in minutes, of a glassy hologram of the invention.

FIG. 3 illustrates the selectivity of an As-S (20%:80% mole basis) glass, 0.045 cm. thick, as monitored with a He-Ne (6328 A.) interrogating beam as the glass is displaced from the angle of maximum intensity (the Bragg angle). The bandwidth, B, for such a sample glass is about 16 minutes, which is quite good, and in addition can be narrowed further by resorting to a thicker glass.

In addition to their multiple storage capabilities, the glasses of interest exhibit very good diffracted intensity efficiencies.

TABLE I

| Mole percent | | | Exposure, minutes | Diffracted power efficiency, percent |
| --- | --- | --- | --- | --- |
| As | S | Br | | |
| 40 | 60 | | 5 | 0.005 |
| 25 | 75 | | 5 | 0.006 |
| 20 | 80 | | 15 | 5.0 |
| 15 | 85 | | 15 | 18.0 |
| 20 | 78 | 2 | 15 | 5.7 |
| 27 | 65 | 8 | 5 | 0.2 |
| 29 | 47 | 24 | 5 | 0.05 |

The results summarized in Table I were obtained with glasses 0.045 cm. in thickness, an argon writing beam (4880 A.) at a writing angle of 11° and at 10 m$\omega$/cm.$^2$ intensity, and with a He-Ne (6328 A.) read-out beam at 12.5° (the angles measured between each beam and the normal to the glass).

Diffracted power efficiency is seen to increase with increasing sulfur content, exposure time and additions of bromine. It is believed that the sulfur and arsenic together form long chain molecules which can be broken up by the incident energy resulting in at least a partial devitrification of the glass and production of free sulfur, perhaps mainly in the form of 8-membered sulfur rings. (Preferably the incident wavelength is less than 1.06 microns.) All this is surmised to happen locally; hence only locally is there expected to be changes in the optical characteristics of the glass. These changes, which account for the interference obtained on read-out, go to completion, usually very rapidly, without the need for any external development step. At sulfur concentrations greater than about 90 mole percent, however, the glasses tend to spontaneously undergo devitrification and therefore are not suitable for holographic recording. Although some diffraction has been observed even at low sulfur levels, a reasonable preferred minimum level is about 80%. In addition, inclusions of bromine are able to increase diffracted power efficiencies without any noticed undesirable side effects. Iodine readily suggests itself as another additive that may have much the same effect.

Indeed, bromine and iodine - modified arsenic - sulfur glasses are considered to be within the invention. These modifications are defined by the areas on the ternary phase diagrams encompassed by straight lines connecting the following composition coordinates:

| Mole percent | | |
| --- | --- | --- |
| As | S | Br |
| 15 | 85 | 0 |
| 21 | 22 | 57 |
| 43 | 57 | 0 |

| Mole percent | | |
| --- | --- | --- |
| As | S | I |
| 15 | 85 | 0 |
| 21 | 46 | 33 |
| 68 | 32 | 0 |

Generally, specific compositions of interest comprise arsenic and sulfur for at least 40 mole percent of the total composition and wherein the ratio (mole basis) of sulfur to arsenic is at least 1:2. Additionally included elements can be, for instance, besides bromine and iodine, selenium and tellurium, which are members of other known glassy systems.

Since the glasses are self-developing, their use in moiré interferometric comparisons is suggested. According to such use, the glass is exposed to first information, as by applying a modulated source beam, allowed to self-develop in place, then exposed to second information which may be different from but similar to the first. The second information, if at all different from the first, will produce moiré fringes as it interferes with the first information which has been previously recorded. Since the glass need not be removed from its position for development after exposure to the first information, no re-alignment is required for comparison with the second information, and hence error due to mis-alignment is eliminated. It should be understood that the second information is not required to be recorded, as is the first, before the comparison can be made; it may be "live" information which interacts with the glass that has been previously exhausted as to its light-sensitivity by the first exposure. On the other hand, both exposures may result in recorded information if desired.

The invention has been described with reference to particular embodiments thereof, but it is intended that variations therefrom which basically rely on the teachings of the invention are to be considered within the scope of the description and the appended claims.

What is claimed is:

1. A method of making a hologram comprising the step of exposing a holographic plate of a glassy composition capable of devitrifying upon exposure to incident light energy, to interfering source and reference beams wherein the glassy composition comprises arsenic and sulfur for at least 40 mole percent of the total composition, and wherein the ratio of sulfur to arsenic is at least 1:2.

2. The method of claim 1 wherein the composition includes at least one or more elements selected from the group consisting of bromine, iodine, selenium and tellurium.

3. The method of claim 1 wherein the glassy composition consists essentially of:
an arsenic sulfur glass, 47–90 mole percent sulfur, remainder arsenic.

4. The method of claim 1 wherein the glassy composition consists essentially of:
an arsenic sulfur glass, 80–90 mole percent sulfur, remainder arsenic.

5. The method of claim 1 wherein the glassy composition consists essentially of:
an arsenic - sulfur - bromine glass defined by the area of the ternary phase diagram encompassed by the straight lines connecting the following composition points:

| Mole percent | | |
| --- | --- | --- |
| As | S | Br |
| 15 | 85 | 0 |
| 21 | 22 | 57 |
| 43 | 57 | 0 |

6. The method of claim 1 wherein the glassy composition consists essentially of:
an arsenic - sulfur - iodine glass defined by the area of the ternary phase diagram encompassed by the straight lines connecting the following composition points:

| Mole percent | | |
| --- | --- | --- |
| As | S | I |
| 15 | 85 | 0 |
| 21 | 46 | 33 |
| 68 | 32 | 0 |

7. A method in accordance with the method of claim 1 wherein the holographic plate is subjected to multiple exposures which exposures are separated by time intervals.

8. A method in accordance with the method of claim 1 where the holographic plate is held fixed with respect to both of the interfering beams during the time intervals in order to effect intensified storage.

9. A method in accordance with the method of claim 1 wherein the orientation of the holographic plate is changed with respect to at least one of the interfering beams during the time intervals between successive exposures in order to effect multiple storage.

10. The method of claim 1 wherein the incident light energy is of a wavelength less than about 1.06 microns.

References Cited

UNITED STATES PATENTS 3,107,170  10/1963  Netke _____ 96—2
2,844,493  7/1958  Schlosser _____ 117—211

OTHER REFERENCES

M. T. Kostyshin: Soviet Physic—Solid State, vol. 8, No. 2, February 1966, p. 451.

GEORGE F. LESMES, Primary Examiner

B. BETTIS, Assistant Examiner

U.S. Cl. X.R.

96—2; 117—211; 350—3.5